United States Patent [19]

Iwata

[11] Patent Number: 4,691,313
[45] Date of Patent: Sep. 1, 1987

[54] WIRELESS TALKING APPARATUS

[75] Inventor: Keisuke Iwata, Tokyo, Japan

[73] Assignee: Iwata Electric Co., Ltd., Tokyo, Japan

[21] Appl. No.: 688,565

[22] Filed: Jan. 3, 1985

[30] Foreign Application Priority Data

Nov. 9, 1984 [JP] Japan .................... 59-236033

[51] Int. Cl.$^4$ ............................................. H04B 1/50
[52] U.S. Cl. ........................................ 370/30; 370/39; 455/82; 379/406
[58] Field of Search .............. 370/30, 32, 24, 38, 370/39, 69.1, 76; 455/78, 82; 179/170.2, 170.8; 381/93

[56] References Cited

U.S. PATENT DOCUMENTS

| 3,206,559 | 9/1965 | Barney | 179/170.2 |
| 3,892,924 | 7/1975 | Vachon | 179/170.8 |
| 4,268,727 | 5/1981 | Agrawal et al. | 179/170.2 |
| 4,392,243 | 7/1983 | Ohhashi et al. | 455/78 |

FOREIGN PATENT DOCUMENTS 0218053 12/1984 Japan .................................... 455/82

Primary Examiner—Robert L. Griffin
Assistant Examiner—M. Huseman
Attorney, Agent, or Firm—Bruce L. Adams; Van C. Wilks

[57] ABSTRACT

Disclosed is a wireless talking apparatus in which signal transmission is performed by utilizing an antenna and simultaneous talking can be performed. The wireless talking apparatus is constituted by a main communication device and a subsidiary communication device, and when these main and subsidiary devices are used in one-to-one correspondency, talking can be performed in a full-duplex communication mode, and in the case where a plurality of subsidiary communication devices are prepared, mutual talking can be performed also between the subsidiary communication devices and the conversation can be monitored by the main communication device.

10 Claims, 5 Drawing Figures

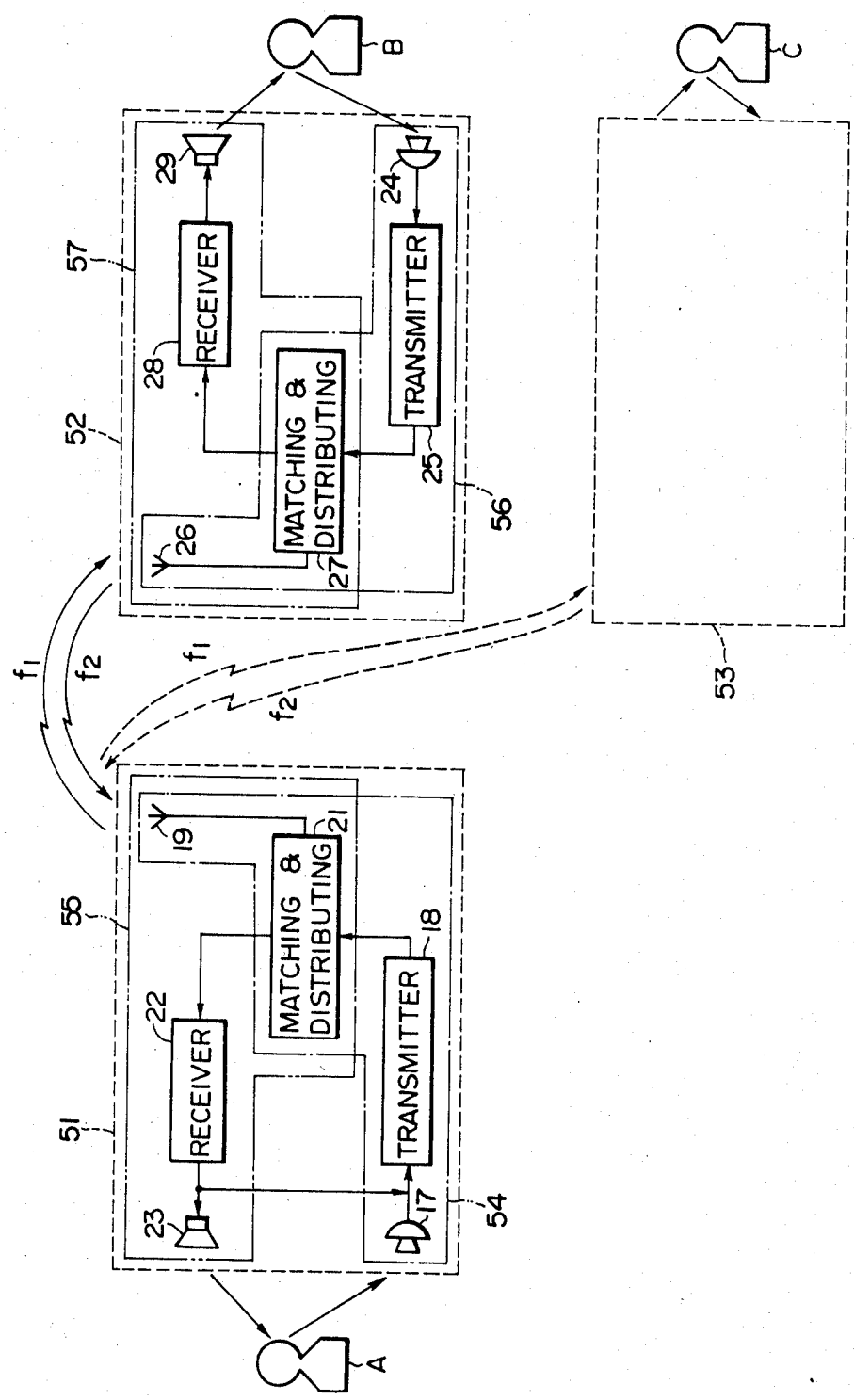

WIRELESS TALKING APPARATUS

BACKGROUND OF THE INVENTION

1. Field of the Invention

The present invention generally relates to a wireless talking apparatus in which transmission of signal is performed by utilizing an antenna and simultaneous talking can be performed, and more particularly to a wireless talking apparatus in which not only talking can be performed in a full-duplex communication mode when a main communication device and a subsidiary communication device are used in one-to-one correspondency but also if further one or more subsidiary communication devices are prepared, simultaneous talking can be performed also between or among the subsidiary communication devices.

2. Description of the Prior Art

Conventionally, there have been proposed various kinds of wireless talking apparatus for communication between separated positions in which not only signal transmission is performed by utilizing an antenna but also simultaneous talking can be performed between two communication devices by utilizing two carrier waves of different frequencies in a specific frequency band assigned for the communication. For example, as shown in FIG. 1, the conventional wireless talking apparatus of this kind is provided with a first communication device 11 and a second communication device 12. The first communication device 11 is provided with a transmitter 13 for transmitting a carrier wave of a frequency $f_1$. The second communication device 12 is provided with a transmitter 15 for transmitting a carrier wave of a frequency $f_2$ and a receiver 16 for receiving the carrier wave of the frequency $f_1$. The transmitter 13 is provided with a microphone 17 for receiving a voice of an operator A to produce a voice signal, a transmitter circuit 18 for transmitting the voice signal from the microphone 17, an antenna 19 for transmitting an output signal from the transmitter circuit 18 to the second communication device 12, and an antenna matching and distributing circuit 21 for automatically switching a signal path such that the signal from the transmitter circuit 18 is transmitted to the antenna 19 and a signal from the second communication device 12 received by the antenna 19 is applied to the receiver 14. The receiver 14 is provided with a receiver circuit 22 for receiving the voice signal from the second communication device 12 and a speaker 23 for converting the voice signal received by the receiver circuit 22 into a voice sound. The antenna 19 and the matching and distributing circuit 21 are commonly used by the transmitter 13 and the receiver 14. Similarly to the transmitter 13, the transmitter 15 in the second communication device 12 is provided with a microphone 24 for receiving a voice of another operator B, a transmitter circuit 25, an antenna 26, and an antenna matching and distributing circuit 27. Similarly to the receiver 14, the receiver 16 in the second communication device 12 is provided with a receiver circuit 28, a speaker 29, an antenna 26 commonly used for the transmitter 15, and an antenna matching and distributing circuit 27.

When the operators A and B carry the first and second communication devices 11 and 12 respectively, the operator A can hear the voice of the operator B through a radio wave formed by modulating the carrier wave of the frequency $f_2$ with the voice signal, while the operator B can hear the voice of the operator A through a radio wave formed by modulating the carrier wave of the frequency $f_1$ with the voice signal. Since the frequencies $f_1$ and $f_2$ of the respective carrier waves are different from each other, the radio waves do not interfere with each other and the operator A and B can talk while hearing the other operator's voice in the same way as ordinary conversation. However, for example, even if a further additional second communication device 31 which is quite the same as the second communication device 12 is prepared and carried by a third operator C, talking between the operators B and C is quite impossible. If the transmission by the additional second communication device 31 is turned off so that the radio wave thereof does not interfere, it is possible to perform simultaneous talking between the operators A and B in the manner as described above. However, the operator C can not hear the voice of the operator B but can hear only the voice of the operator A.

In order to improve the device in the disadvantage as described above, there has been proposed a multi-talking wireless communication apparatus in which a repeater is provided so as to perform simultaneous talking among a plurality of communication devices. Referring to FIG. 2, such a communication apparatus will be described hereinafter.

In the drawing there are provided three communication devices 32, 33, and 34, and a repeater 35 for enabling mutual talking thereamong. The communication device 32 is provided with a transmitter $T_1$ for transmitting a carrier wave of a frequency $f_1$, the communication device 33 is provided with a transmitter $T_2$ for transmitting a carrier wave of a frequency $f_2$, and the communication device 34 is provided with a transmitter $T_3$ for transmitting a carrier wave of a frequency $f_3$.

The communication devices 32, 33, and 34 are also provided with three receivers $R_0$ each receiving a carrier wave of a frequency $f_0$. The repeater 35 is provided with receiving repeaters $R_1$, $R_2$ and $R_3$ which correspond to the transmitters in number, and a transmitter $T_0$ for mixing the received signals from these repeaters and for transmitting a carrier wave of a frequency $f_0$. Since the respective frequencies of the transmitters $T_1$, $T_2$, and $T_3$ and the transmitter $T_0$ are different from each other, they do not interfere with each other and, therefore, the simultaneous talking can be mutually performed through the repeater 35 among the operators A, B and C who carry the communication devices 32, 33, and 34 respectively, similarly to an ordinary conversation mode.

In the thus arranged wireless communication apparatus for multi-talking, however, the repeaters as described above are always necessary, so that the apparatus is inconvenient when it is used in one-to-one correspondency for performing the simultaneous talking. Since the used receiving repeaters are required to meet the number of the provided communication devices, the number of the provided communication devices must be set in advance, so that the number of the communication devices can not be simply increased. Further, the repeater 35 mixes the received signals from the transmitters $T_1$, $T_2$, and $T_3$ and the transmitter $T_0$ modulates the carrier wave with the mixed signal and transmits the modulated carrier wave. Accordingly, the assignment of modulation rate for the respective received signals from the receiving repeaters $R_1$, $R_2$ and $R_3$ becomes one-third, and in the case where ten communication devices are provided, the assignment of the modulation rate of the same becomes one-tenth, so that SN (signal to noise) ratio becomes considerably worse and therefore the communication devices can not be used practically.

SUMMARY OF THE INVENTION

An object of the present invention is to provide a wireless talking apparatus in which not only when a main communication device and a subsidiary communication device are used in one-to-one correspondency, talking can be performed in a full-duplex communication system, but also in the case where a plurality of subsidiary communication devices are prepared, talking can be performed also among the subsidiary communication devices.

Another object of the present invention is to provide a wireless talking apparatus in which the number of the subsidiary communication devices can be desiredly increased or decreased and there is no need to reform the main communication device correspondingly and the SN ratio is not lowered.

According to the present invention, the wireless talking apparatus in which signal transmission is performed by utilizing an antenna and simultaneous talking can be performed comprises a main communication device including a transmitter for transmitting a modulated carrier wave of a frequency $f_1$, a receiver for receiving a modulated carrier wave of a frequency $f_2$, and mixing means for mixing a received signal with a transmission signal, and a subsidiary communication device including a transmitter for transmitting a modulated carrier wave of the frequency $f_2$ to the main communication device and a receiver for receiving the modulated carrier wave of the frequency $f_1$ from the main communication device.

According to a preferred embodiment, the main communication device further comprises automatic transmission change-over means for automatically holding the transmission mode upon reception of the transmission signal from the subsidiary communication device, and the mixing means comprises a matching circuit connected such that an output signal from a squelch circuit of the receiver for the frequency $f_1$ is applied to a modulator of the transmitter for the frequency $f_2$.

In the wireless talking apparatus according to the present invention, the respective output signals of the main communication device and the subsidiary communication device are different in frequency from each other and do not interfere with each other, so that when the main communication device and the subsidiary communication device are used in one-to-one correspondency, talking can be performed in a full-duplex communication mode. Since the received signal transmitted from the subsidiary communication device is contained in the transmission signal to be transmitted from the main communication device by the function of the mixing means, in the case where a plurality of subsidiary communication device are prepared, operators carrying the subsidiary communications devices can hear all the contents of the conversation between the main communication device and selected one of the subsidiary communication devices. The operators carrying the subsidiary communication devices can mutually talk through the main communication device, and the number of increase or decrease in the subsidiary communication devices can be quite freely set.

The above and other objects, features and advantages of the present invention will be apparent from the detailed description taken in conjunction with the accompanying drawings.

BRIEF DESCRIPTION OF THE DRAWINGS

FIG. 3 is a block diagram showing an embodiment of the wireless talking apparatus according to the present invention;

DETAILED DESCRIPTION OF PREFERRED EMBODIMENT

Figure 1:
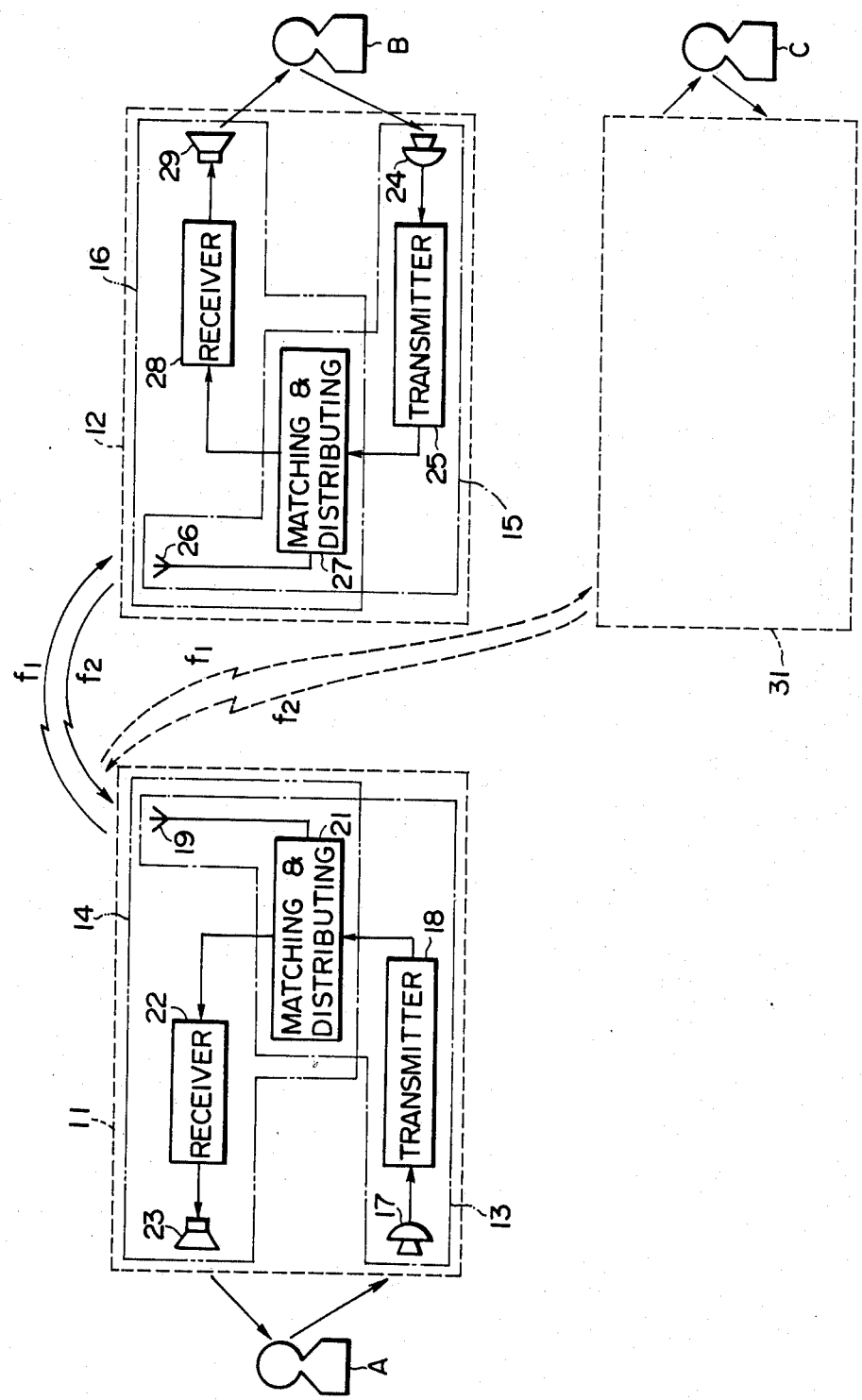
FIG. 1 is a block diagram showing the conventional wireless talking apparatus.
Figure 2:
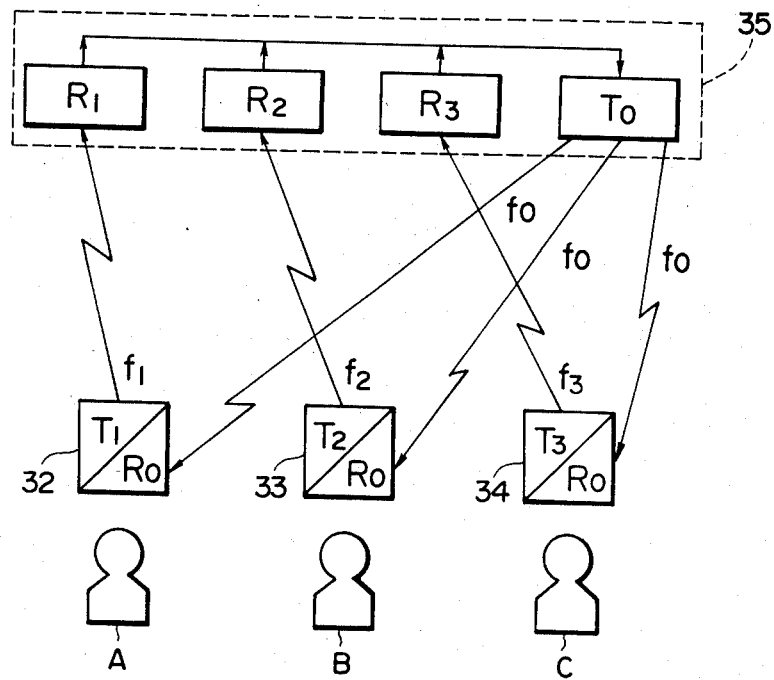
FIG. 2 is a block diagram showing the conventional wireless communication apparatus for multi-talking.

FIG. 3 shows an outline of the wireless talking apparatus according to the present invention. In the drawing, there are provided a main communication device 51 and two subsidiary communication devices 52 and 53. The main communication device 51 is provided with a transmitter 54 for transmitting a modulated carrier wave of a frequency $f_1$ and a receiver 55 for receiving a modulated carrier wave of a frequency $f_2$. The subsidiary communication device 52 is provided with a transmitter 56 for transmitting a modulated carrier wave of the frequency $f_2$ and a receiver 57 for receiving a modulated carrier wave of the frequency $f_1$. Since the subsidiary communication device 53 is arranged quite in the same manner as the subsidiary communication device 52, it is shown by a broken line block with its contents omitted in FIG. 3. Arranged in the same manner as those in the conventional example described above, other parts of the communication devices 51, 52 and 53 are referenced correspondingly and the description thereof is omitted.

In the main communication device 51, an output signal from a receiving circuit 22 is applied to a transmitting circuit 18 and the received signal is mixed with a transmission signal.

Accordingly, when the main communication device 51 and the subsidiary communication device 52 are used in one-to-one correspondency, an operator A can hear a voice of another operator B through a radio wave formed by modulating the carrier wave of the frequency $f_2$. Since the received signal is mixed with the transmission signal in the main communication device 51, the operator B carrying the subsidiary communication device 52 cn hear the voice of the operator A and the voice of himself through the radio wave formed by modulating the carrier wave of the frequency $f_2$. Since the frequencies $f_1$ and $f_2$ of the carrier waves are different from each other, the radio waves as described above do not interfere with each other and simultaneous talking can be performed between the operators A and B.

In the case where the additional subsidiary communication device 53, if only one of the subsidiary communication devices is operated to be in the transmission mode so as to prevent radio wave interference, mutual talking can be performed among the operators A, B and C. That is to say, if the subsidiary communication device 52 is made to be the transmission mode, simultaneous talking can be performed between the operator A and B in the same way as the case described above where the main communication device 51 and the subsidiary communication 52 are used in one-to-one correspondency, and, at the same time the operator C can hear all the contents of the conversation between the operators A and B. If the subsidiary communication device 53 is made to be in the transmission mode and the subsidiary communication device 52 is made to be in the non-transmission mode, by the indication of voice of the operator A or B, not only the simultaneous talk can be performed between the operators A and C, but also the operator B can hear all the contents of the conversation. Further, if mode of the subsidiary communication devices 52 and 53 are switched between the transmission mode and non-transmission mode, simultaneous talk can be performed between the operators B and C, and the operator A can hear all the contents of the conversation.

If further one or more subsidiary communication devices are added, talking can be performed among the communication devices according to the same operations as described above. Even if any numbers of subsidiary communication devices are additionally provided, mutual talking can be performed among the operators through the operations as described above by preparing the main communication device in which the received signal is mixed with the transmission signal.

Figure 4:
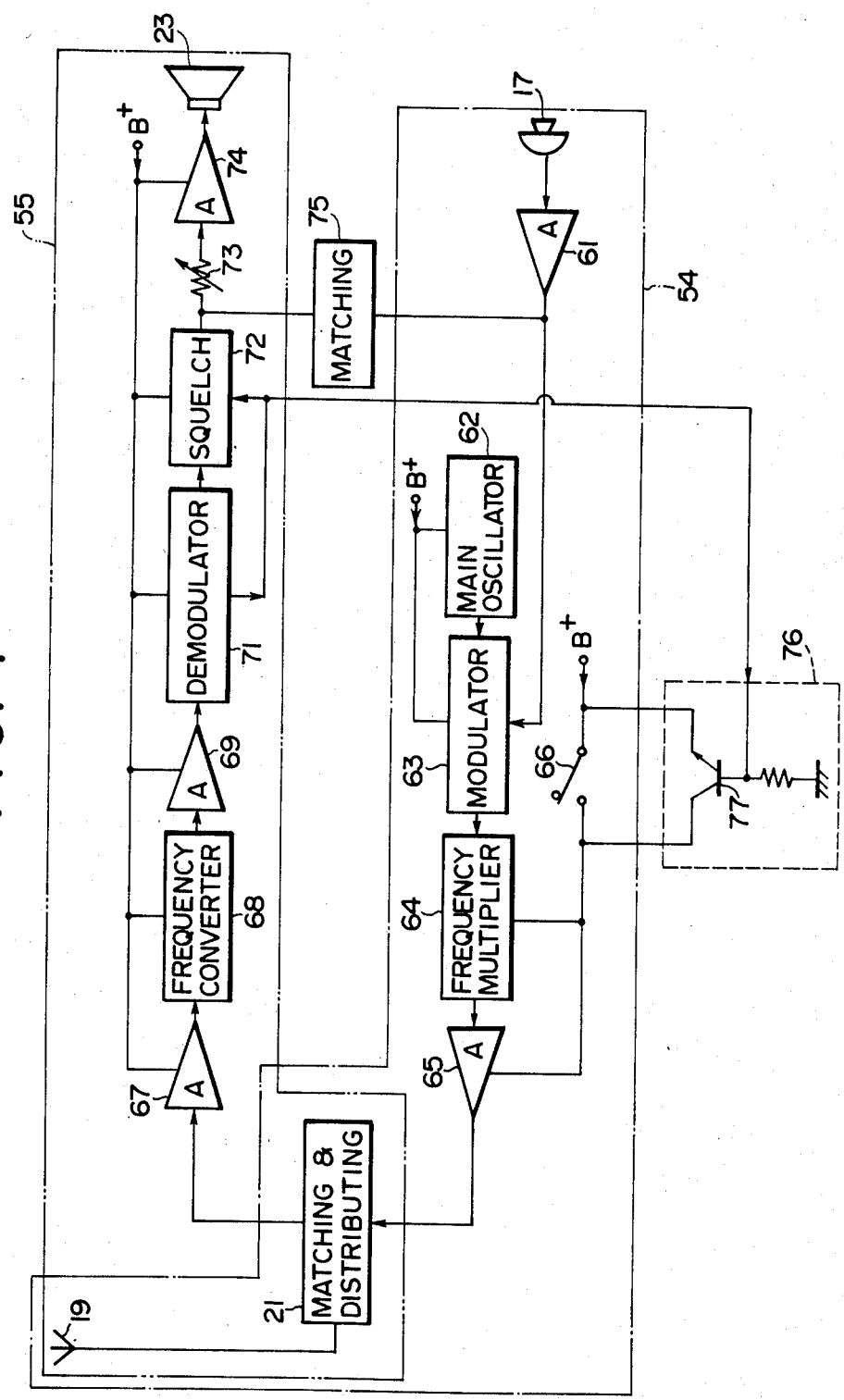
FIG. 4 is a detailed block diagram of the main communication device shown in FIG. 3.

FIG. 4 shows the main communication device 51 of the embodiment according to the present invention in detail. Referring to the drawing, the main communication device 51 will be described hereinafter. The transmitter 54 is provided with an amplifier 61 for amplifying a voice input signal from a microphone 17, a main oscillator 62, a modulator 63 with its input connected to the respective outputs of the amplifier 61 and the main oscillator 62, a frequency multiplier 64 with its input connected to the output of the modulator 63, and a power amplifier 65 with its input connected to the output of the frequency multiplier 64 and with its output connected to the input of an antenna matching and distributing circuit 21. The main oscillator 62 and the modulator 63 are commonly connected to a power supply terminal B+ from a power supply circuit shown in FIG. 5. The frequency multiplier 64 and the power amplifier 65 are commonly connected to the power supply terminal B+ through a manual switch 66 which controls to turn on and off the transmitter 54 by manual operations. The receiver 55 is provided with a high frequency amplifier 67 with its input connected to the output of the antenna matching and distributing circuit 21, a frequency converter 68 with its input connected to the output of the amplifier 67, an intermediate frequency amplifier 69 with its input connected to the output of the frequency converter 68, a demodulator 71 with its input connected to the output of the amplifier 69, a noise suppressing circuit, that is a squelch circuit 72, with its input connected to the output of the demodulator 71, a variable resistor 73 with its input connected to the output of the squelch circuit 72, and a power amplifier 74 with its input connected to the output of the variable resistor 73. A speaker 23 is connected to the output of the power amplifier 74. The amplifiers 67, 69 and 74, the frequency converter 68, the demodulator 71 and the squelch circuit 72 are commonly connected to the power supply terminal B+. Since the respective arrangements of the transmitter 54 and the receiver 55 as described above are quite the same as those in the conventional ones, the detailed description thereof is omitted.

The apparatus according to the present invention is arranged such that the output signal from the squelch circuit 72 passed through the matching circuit 75 is applied together with the output of the amplifier 61 to the modulator 63. Thus, the received signal obtained by the receiver 55 is mixed with the transmission signal from the speaker 17. The matching circuit 75 performs impedance and level conversions of the received signal and may be a well known one constituted by a combination circuit of capacitors and resistors, or transformers, or the like. The apparatus according to the present invention is also arranged such that a DC output signal applied from the demodulator 71 to the squelch circuit 72 is applied to an automatic change-over switch 76. This automatic change-over switch 76 is connected in parallel to the manual switch 66, and constituted, for example, by a solid-state switching element such as a transistor 77, as shown in the drawing.

The subsidiary communication devices 52 and 53 may be arranged such that the mixing circuit having the matching circuit 75 and the circuit of the automatic change-over switch 76 shown in FIG. 4 are omitted and the circuit constants of various constituent components are properly changed corresponding to the frequency of the carrier wave to be set. Accordingly the detailed description and the drawing of the subsidiary communication devices 52 and 53 are omitted.

Figure 5:
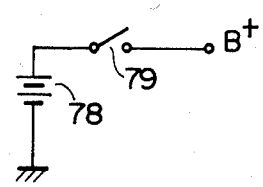
FIG. 5 is a circuit diagram showing a power supply of the main communication device shown in FIG. 4.

FIG. 5 is a circuit diagram of a power supply used for each of the main communication device 51 and the subsidiary communication devices 52 and 53. In the drawing, a battery 78 used for the power supply is connected to the power supply terminal B+ through a manual switch 79.

In the thus arranged main communication device 51, the carrier wave modulated by the voice signal of the operator A together with the voice signal from the subsidiary communication device 52 or 53 is transmitted through the antenna 19. Therefore, when talking is performed between the operators A and B, the operator C can hear all the contents of the conversation if the subsidiary communication device 53 is made to be in the reception mode. Further, between the operators B and C, if the mode is changed over alternately between the transmission mode and non-transmission mode by operating the manual switch 66, the transmission signal of one of the operators B and C is transmitted to each other through the main communication device 51 to talk alternately. The automatic change-over switch 76 of the main communication device 51 can be automatically controlled to assume the transmission mode independently of the state of the manual switch 66 when the received signal is detected. Accordingly, in the case where mutual talking is performed between the operators B and C carrying the subsidiary communication devices 52 and 53 respectively, it is sufficient for the operator A carrying the main communication device 51 to only keep the manual switch 79 for the power supply in the on-state without performing any particular operations.

What is claimed is:

1. A wireless talking apparatus for simultaneous talking comprising:
a main communication device including a microphone for producing a first voice signal, a transmitter for modulating a carrier wave of a frequency $f_1$ by the first voice signal and for transmitting a modulated carrier wave of the frequency $f_1$, a receiver for receiving a modulated carrier wave of a frequency $f_2$ and for demodulating the modulated carrier wave of the frequency $f_2$ to produce a second voice signal, and means connected between the transmitter and the receiver for applying the seond voice signal from the receiver to the transmitter to enable the transmitter to modulate the carrier wave of the frequency $f_1$ not only by the first voice signal but also by the second voice signal; and a subsidiary communication device including a transmitter for transmitting a modulated carrier wave of the frequency $f_2$ to the main communication device, and a receiver for receiving the modulated carrier wave of the frequency $f_1$ modulated by the first voice signal and the second voice signal from the main communication device.

2. A wireless talking apparatus according to claim 1, in which the main communication device further comprises automatic transmission change-over means for automatically holding the transmitter in operation upon reception of the modulated carrier wave of the frequency $f_2$ from the subsidiary communiation device.

3. A wireless talking apparatus according to claim 2, in which the automatic transmission change-over means comprises solid-state switching elements for actuating the transmitter.

4. A wireless talking apparatus according to claim 1, in which the main communication device transmitter comprises a modulator for modulating the carrier wave of the frequency $f_1$ by the second voice signal, the main communication device receiver includes a squelch circuit for suppressing the noise of the second voice signal, and means connected between the squelch circuit and the modulator for applying the second voice signal from the squelch circuit of the receiver to the modulator of the transmitter.

5. A wireless talking apparatus according to claim 1, comprising a plurality of the subsidiary communication devices.

6. A wireless talking system including at least two communication devices disposed in remote positions apart from one another, each of the communication devices having a microphone for producing a first voice signal, a transmitter connected to the microphone for modulating a carrier wave of a predetermined frequency by the first voice signal and for transmitting the modulated carrier wave of the predetermined frequency, a receiver for receiving a modulated carrier wave of another predetermined frequency which has been transmitted from another communication device and for demodulating the modulated carrier wave of the other predetermined frequency to produce a second voice signal, and a speaker connected to the receiver for reproducing sounds from the second voice signal; wherein one of the communication devices further comprises means connected between the receiver and the transmitter thereof for applying the second voice signal to the transitter to enble the transmitter to transmit the modulated carrier wave of the predetermined frequency modulated not only by the first voice signal but also by the second voice signal for reception by the other communication devices.

7. A wireless talking system according to claim 6, wherein the means connected between the receiver and the transmitter comprises a matching circuit for performing impedance and level conversions of the second voice signal.

8. A wireless talking system according to claim 6, wherein the transmitter of the said one communication device comprises a modulator for modulating the carrier wave of the predetermined frequency.

9. A wireless talking system according to claim 8, wherein the receiver of the said one communication device comprises a demodulator for demodulating the modulated carrier wave of the other predetermined frequency to produce the second voice signal, and a squelch circuit for suppressing the moise of the second voice signal.

10. A wireless talking system according to claim 9, wherein the means for applying the second voice signal to the transmitter is connected between the squelch circuit and the modulator.

* * * * *